Dec. 12, 1967  SUKEYOSHI SAITO  3,357,235
TESTING APPARATUS FOR APPLYING RAPIDLY FLUCTUATING
AIR PRESSURE ON TEST SPECIMENS
Filed July 26, 1965

United States Patent Office 3,357,235
Patented Dec. 12, 1967

3,357,235
TESTING APPARATUS FOR APPLYING RAPIDLY FLUCTUATING AIR PRESSURE ON TEST SPECIMENS
Sukeyoshi Saito, 1094 7-chome, Kamimeguro, Meguro-ku, Tokyo, Japan
Filed July 26, 1965, Ser. No. 474,728
Claims priority, application Japan, Aug. 11, 1964, 39/44,730
3 Claims. (Cl. 73—37)

ABSTRACT OF THE DISCLOSURE

Building panels to be tested are mounted in an opening in an air pressure chamber. Air under pressure is supplied to the chamber through a supply tube and evacuated through an exhaust tube. Interconnected rotating valves in these tubes open and close the passageways to simulate the effect of gusts of wind on the panel. Water may be sprayed on the panel simultaneously with the wind test. The operation of the vanes is controlled by a suitable programmer.

---

This invention relates to a testing apparatus for applying rapidly fluctuating air pressure on test specimens.

A main object of the present invention is to provide a testing apparatus which enables the experimental testing of panels such as window sash with glass panes, curtain walls, etc. against wind pressure having wave forms which fluctuate rapidly as in typhoons or hurricanes.

Heretofore testing tunnels have been utilized for wind resistance tests on panels such as window sash with glass panes, curtain walls, etc. In the conventional testing tunnels, however, it is mechanically difficult to change the wind pressure rapidly, so that it is impossible to reproduce in the testing tunnels, a wind pressure having wave forms fluctuating rapidly and intricately such as in typhoons or hurricanes.

The testing apparatus according to the present invention comprises an air pressure chamber provided with an opening for mounting a testing panel, said air pressure chamber being constituted to reproduce any desired air pressure which fluctuates rapidly and intricately, the wind-resisting characteristics being tested by applying wind pressure having wave forms fluctuating rapidly and intricately corresponding to those of typhoons or hurricanes on the panels to be used as test specimens.

In order to obtain the above object, the testing apparatus according to the present invention comprises an air pressure chamber provided with an opening for mounting the panel to be used as a test specimen, a blowing tube for feeding air current by a positive blower and an exhaust tube for exhausting air current by negative blower, said tubes being in communication with said air pressure chamber, each tube being provided with a valve for opening and closing the flow of the respective air current, said two valves being interlocked with each other so that there is always a phase difference of 90° between the positions of their movable elements. With such an arrangement, it is possible to change the pressure in the air pressure chamber very rapidly and sharply in accordance with the opening and closing operation of the valves.

Furthermore, in the testing apparatus according to the present invention, said two valves, which are constructed to be interlocked, are adapted to be operated by a hydro motor connected to a servo valve controlled by an appropriate instruction mechanism. With such a construction, it is possible to operate the valves rapidly and correctly according to the instruction from the instruction mechanism.

In an embodiment of the present invention, an analog computer is used for said instruction mechanism, which is arranged to control the servo valve by a P.I.D. controller which has been programmed in a function generator and the analog computer. This testing apparatus receives the change of air pressure in the air pressure chamber by a pressure transmitter and transforms it into electric signals, and feeds back said electric signals into a circuit connecting said function generator and the P.I.D. controller. With the above-stated arrangement, it becomes possible to transmit correctly orders of wave forms fluctuating so rapidly and intricately such as in the case of typhoons and hurricanes, and at the same time it is possible to control automatically the pressure variation reproduced in the air pressure chamber to coincide with the wave-form instruction set to the function generator.

In the testing apparatus according to the invention, there is provided, in the air pressure chamber, a feed water pipe having a plurality of nozzles, through which it is possible to spray the surface of the panel to be tested which has been mounted at the opening of the air pressure chamber. With this construction, it is possible to spray the panel to be tested at the same time as subjecting it with rapidly fluctuating air pressure, so that it becomes possible to test the panel under testing conditions which coincide with typhoon or hurricane conditions accompanied by rain.

The characteristics of the present invention will be made more clear from the following description referring to the accompanying drawings in which are shown several embodiments of the present invention.

Figure 1:
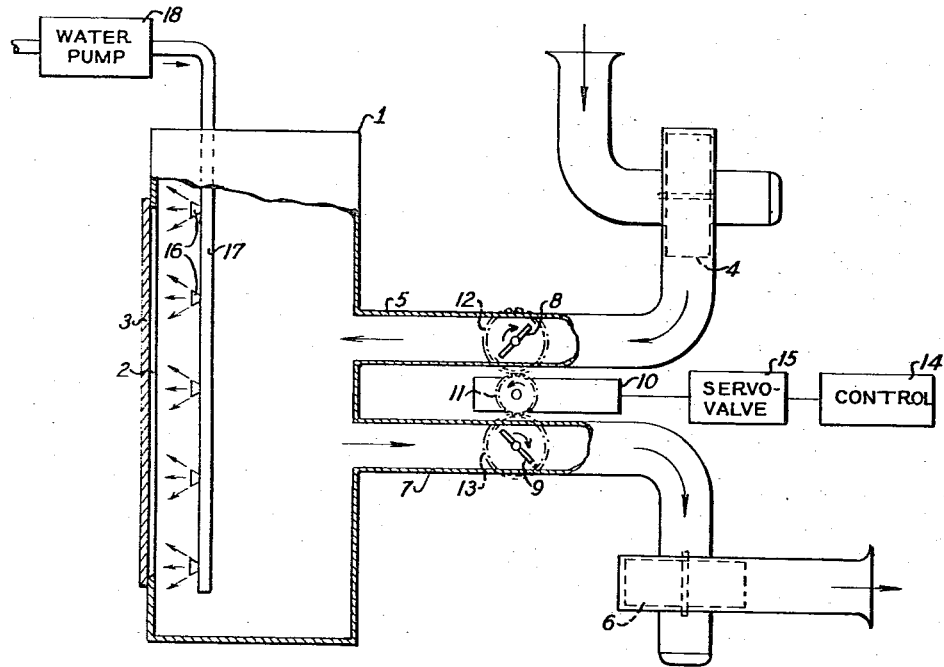
FIG. 1 shows a sectional view of an embodiment of the testing apparatus.

As shown in FIG. 1, an air pressure chamber 1 is provided with an opening 2 in the side wall thereof, and a panel 3 to be tested is mounted in close sealing relation at opening 2. On the side wall facing the opening 2 of air pressure chamber 1 are a blowing tube 5 supplied by a positive blower 4 and an exhaust tube 7 exhausted by a negative blower 6, tubes 5 and 7 being parallel.

On said blowing tube 5 and the exhaust tube 7, butterfly valves 8, 9 are inserted respectively at opposed positions of both tubes.

In this embodiment butterfly valves are used as opening and closing valves, but it is also possible to use rotary valves or gate valves.

The two butterfly valves 8, 9 are so interlocked that a phase angle of 90° is maintained between them. That is, the butterfly valves 8, 9 are constituted to be operated by a rotary actuator 10, and a gear wheel 11 of the rotary actuator 10 engages in common with gears 12, 13, mounted on the shafts of the butterfly valves 8, 9. The rotary actuator 10 is connected to a servo valve 15 controlled by an appropriate instruction mechanism 14.

It is evident that the rotary actuator 10 is not limited to the one shown above, but any suitable hydro motor may be used.

Figure 2:
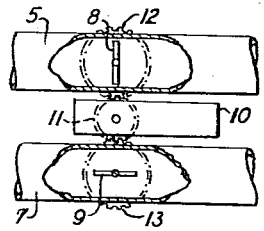
FIGS. 2 and 3 are diagrammatic views intended to explain an interlocking operation of an opening and closing valve shown in FIG. 1.
Figure 3:
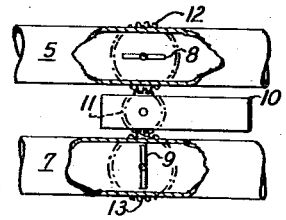

The main body of this testing apparatus is constructed as stated above, and the changing of air pressure in the air pressure chamber 1 is effected as follows. The positive blower 4 and the negative blower 6 are operated and the butterfly valves 8, 9 are actuated with interlocking operation, by the rotary actuator 10 so as to change the air pressure in the air pressure chamber 1 by changing the quantity of air fed to the air pressure chamber 1 and the quantity of air exhausted from the air pressure chamber 1. In this case, as stated previously, since the butterfly valves are so interlocked as to maintain a phase difference of 90° with each other, the butterfly valve 9 of the exhaust tube 7 is fully opened when the butterfly valve 8 of the blowing tube 5 is fully closed as shown in FIG. 2, and the butterfly valve 9 of the exhaust tube 7 is fully closed when the butterfly valve 8 of the blowing tube 5 is fully opened as shown in FIG. 3. Furthermore at the intermediate angles of the butterfly valves 8, 9, there is always a phase difference of 90° between them. Thereby, it is possible to change the air pressure in the air pressure chamber 1 rapidly and sharply in response to the operation of the butterfly valves 8, 9.

Since the rotary actuator 10 can produce rapid positive and reverse rotation with large torque by the servo valve 15 controlled by the instruction mechanism, the relatively large butterfly valves 8, 9 are operated rapidly.

All of the constitution of the above-stated testing apparatus according to the present invention is most suitable for reproducing pressure fluctuation having wave forms which change so rapidly and intricately such as typhoons or hurricanes in the air pressure chamber 1.

In the next place, there are provided in the air pressure chamber of the testing apparatus of the present invention, several water feeding pipes 17 which are arranged in parallel, each equipped with a plurality of nozzles 16. To these water feeding pipes 17 is connected a water pump 18, by which it is possible to spray the surface of the panel 2 to be tested, at the same time that fluctuating pressure changes are applied to the surface of the panel to be tested. Such panel may, for example, be a window sash with glass panes, which has been mounted in the opening of the air pressure chamber 1.

Figure 4:
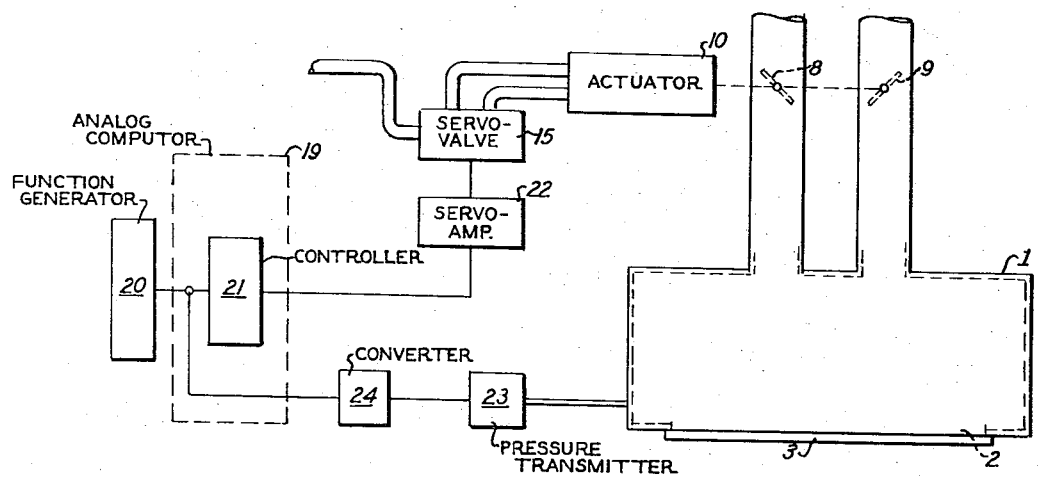
FIG. 4 is a block diagram of an embodiment of the present invention where an analog computer is used as an instruction mechanism.

In the embodiment of the testing device of this invention shown in FIG. 4, therein is shown an analog computer 19 employed for said instruction mechanism. That is, a circuit is composed of a function generator 20; P.I.D. controller 21 programmed in analog computer 19 (such P.I.D. controller having proportional, integral and derivative action); a servo amplifier 22; and a servo valve 15.

The reason for using analog computer 19 as the instruction mechanism is that it is possible to set freely an instruction program of wave forms fluctuating rapidly and intricately such as typhoons or hurricanes, and that at the same time it is possible to control the servo valve in response rapidly with said instruction program by means of P.I.D. controller 21 programmed in said analog computer 19. Furthermore it is also possible to constitute a feedback circuit which will be described in the following.

The above-said feedback circuit is so constituted that the change of the air pressure in the air pressure chamber 1 is received in a pressure transmitter 23, converting it into electric signals, and feeding them back to a circuit connecting said function generator 20 and the P.I.D. controller 21 through a converter 24.

By means of the above mentioned feedback circuit, it is possible to control automatically the change of air pressure in the air pressure chamber 1 reproduced in response to the instruction program so that it may exactly coincide with the instruction program.

In the embodiment of the testing apparatus according to the present invention, when the program of wave forms of a reference typhoon has been set in a function generator 20, it is possible to reproduce an air pressure fluctuation completely coinciding with said wave forms of typhoon in the air pressure chamber 1.

What I claim as new and desire to secure by Letters Patent of the United States is:

1. A testing apparatus for applying an air pressure fluctuating rapidly on test specimens, said apparatus comprising an air pressure chamber provided with an opening for mounting a panel to be used as a test specimen, a supply tube for feeding air to said chamber and an exhaust tube for exhausting air from said chamber, said supply tube and the exhaust tube respectively including a valve for opening and closing the respective tube, means interlocking said valves such that there is always a phase difference of 90° between their positions, a hydro motor connected to said valves to drive the same and thereby control the relative opening and closing of the tubes, a servo valve coupled to said motor to operate the same, and means coupled to the servo valve for controlling the same.

2. A testing apparatus as claimed in claim 1, wherein said means for controlling the servo valve is an analog computer serving to establish the conditions in the air chamber, and feedback means between the air chamber and the analog computer for modifying the control of the servo valve such that the conditions which prevail in the chamber are those established by the analog computer.

3. A testing apparatus as claimed in claim 2 comprising a feed water pipe having a plurality of nozzles in the air pressure chamber for spraying the panel to be tested.

References Cited
UNITED STATES PATENTS

| | | | |
|---|---|---|---|
| 1,827,530 | 10/1931 | Le Grand | 73—432 |
| 3,005,339 | 10/1961 | Loftin | 73—147 |
| 3,054,288 | 9/1962 | Bowman et al. | 73—168 |

OTHER REFERENCES

"World's Worst Weather Helps Build World's Best Air Force," Instrumentation, vol. 5, No. 6, p. 7, 1952.

LOUIS R. PRINCE, *Primary Examiner.*

W. HENRY, *Assistant Examiner.*